UNITED STATES PATENT OFFICE.

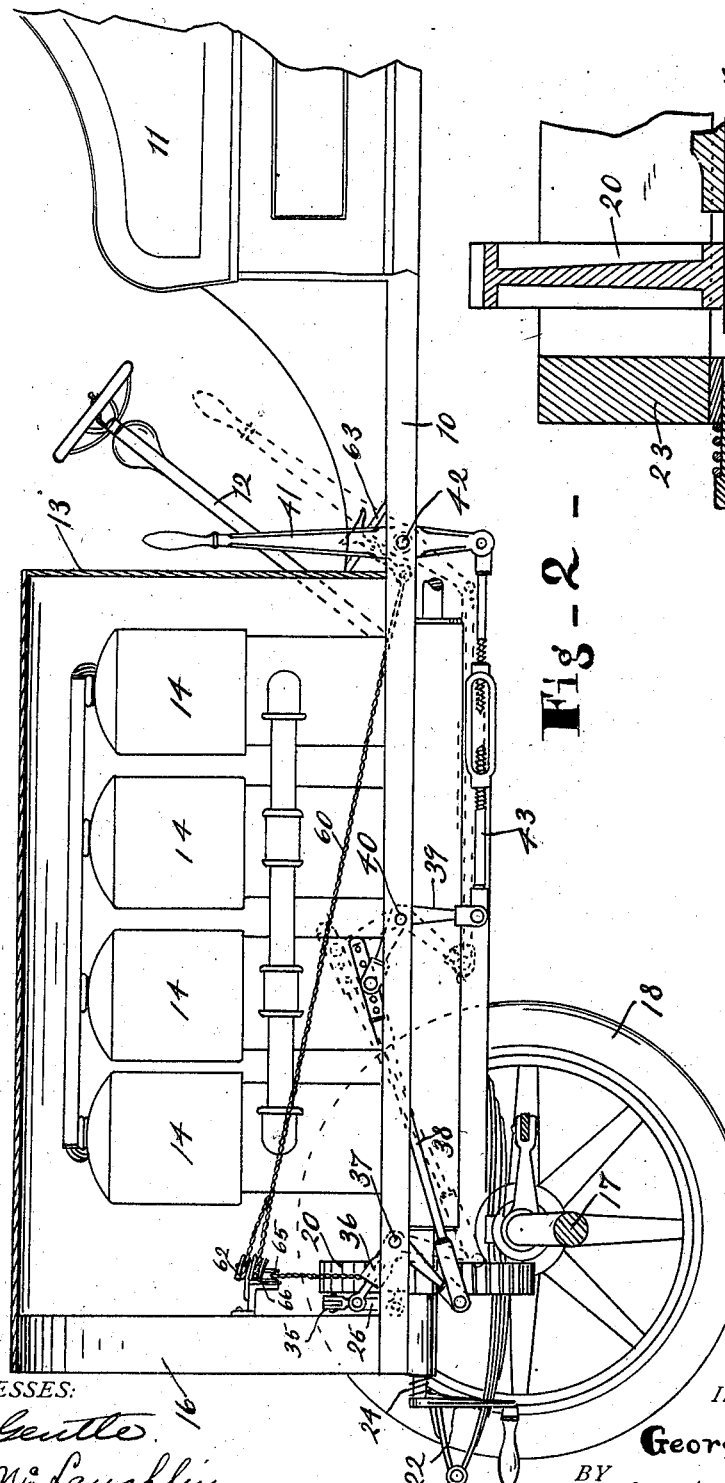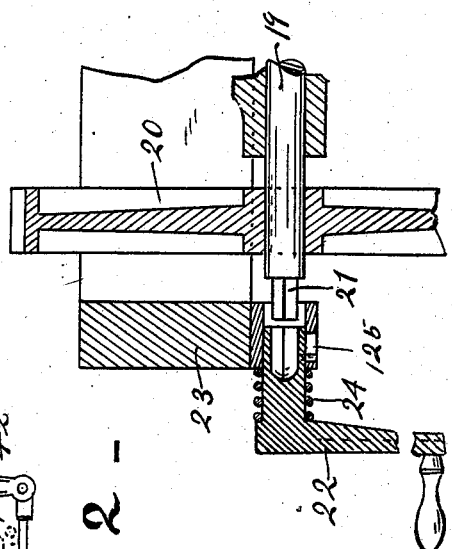
G. BURESS.
GAS ENGINE STARTER.
APPLICATION FILED MAR. 25, 1909.
944,315.
Patented Dec. 28, 1909.
2 SHEETS—SHEET 1.

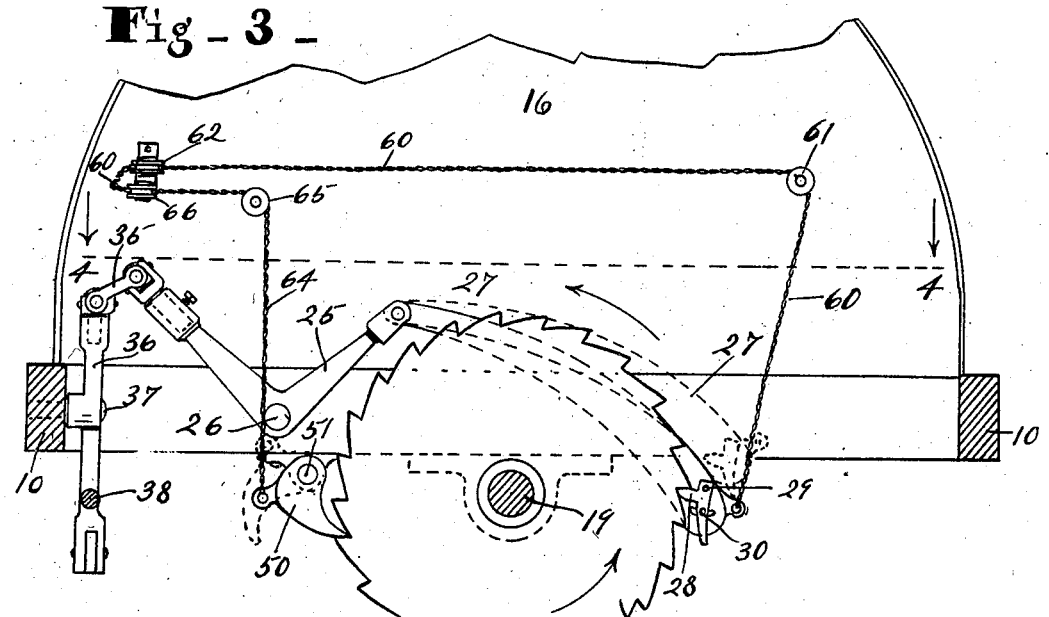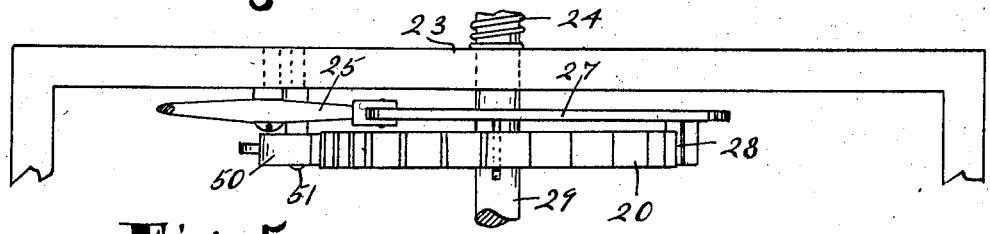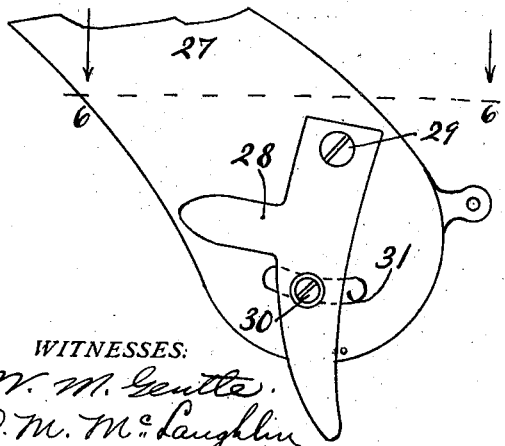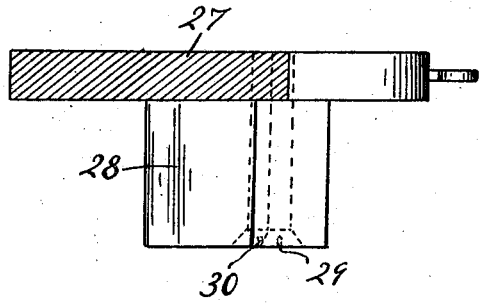

GEORGE BURESS, OF INDIANAPOLIS, INDIANA, ASSIGNOR OF ONE-HALF TO ROBERT W. LONG, OF INDIANAPOLIS, INDIANA.

GAS-ENGINE STARTER.

944,315.  Specification of Letters Patent.  Patented Dec. 28, 1909.

Application filed March 25, 1909. Serial No. 485,581.

*To all whom it may concern:*

Be it known that I, GEORGE BURESS, of Indianapolis, county of Marion, and State of Indiana, have invented a certain new and useful Gas-Engine Starter; and I do hereby declare that the following is a full, clear, and exact description thereof, reference being had to the accompanying drawings, in which like numerals refer to like parts.

The object of this invention is to provide a satisfactory mechanical means for starting gasolene engines, especially designed with reference to use in connection with automobiles. In such case the engine can be started or actuated by a lever near the seat of the driver and without the trouble of getting out and going to the front end of the automobile for cranking the engine.

The improvements referred to herein are made over the construction set forth in my former application, Serial No. 435,415, filed May 28, 1908.

The chief feature of the invention consists in providing an adjustable tooth or pawl on the end of the bar that engages the teeth of a ratchet wheel on the engine shaft and turns it sufficiently to start the engine. This adjustable pawl is a peculiar construction and not only enables the device to always catch and pull through a large arc, but it is adaptable to ratchet wheels of varying character or designs of teeth, so as to operate effectively.

Another feature of the invention consists in providing a gravity pawl for preventing backward movement of the ratchet wheel while the engine is being started, and means for holding it out of engagement after the engine is started, that is associated with means for holding the actuating pawl or hook out of engagement after the engine is started.

The full nature of the invention will be understood from the accompanying drawings and the following description and claims:

Figure 1 is a side elevation of the forward part of an automobile with one front wheel removed and the axle in section, the rear part of the machine being broken away. Fig. 2 is a vertical section through the means for starting the engine shaft and associated parts. Fig. 3 is an end elevation of the engine casing of the automobile with the parts in vertical transverse section showing the device in condition for starting the engine. Fig. 4 is a section on the line 4—4 of Fig. 3. Fig. 5 is an enlarged side elevation of the bar and pawl for actuating the ratchet wheel on the engine shaft. Fig. 6 is a section on the line 6—6 of Fig. 5.

In detail there is shown in the drawings the frame 10 of an automobile with seat 11, steering wheel 12, engine casing 13, four-cylinder engine 14, front casing 16, front axle 17 and front wheel 18.

19 is the engine shaft on which the ratchet wheel 20 is secured. The engine shaft has a squared end 21 and adapted to receive the square socket end of the crank 22. The shank of the crank 22 is mounted in the frame bar 23 and normally pushed outwardly by spring 24 as far as the pin 125 will permit, so that the starting crank will be normally held out of locking engagement with the engine shaft.

For starting the engine I provide a bell crank lever 25 fulcrumed between its ends at 26 with a starting bar 27 extending from one end of the bell crank lever across and immediately to the rear of the upper part of the ratchet wheel 20, and on the free end of said bar 27 I mount the adjustable pawl or tooth 28, which is adapted to engage the teeth of the ratchet wheel when the bell crank lever is actuated and the bar 27 withdrawn and thus give the ratchet wheel a start. This adjustable pawl consists of a tooth portion extending substantially at right angles from the body portion thereof, which body portion is at its upper end pivoted on the pin 29, and an adjusting pin or set screw 30 extends through the body portion of said pawl 28 and through a slot 31 in the bar 27, which slot is curved concentrically with the pin 29. This construction enables me to give the tooth or pawl 28 any desired pitch and thus get the best catch possible on the teeth of the ratchet wheel. The pull of the bar 27 is tangential so it will tend to revolve the wheel 20.

One end of the bell crank lever 25 is connected by a link 35 with another bell crank lever 36 fulcrumed at 37 to the side of the frame and with a connecting rod 38 leading therefrom to a third bell crank lever 39 fulcrumed at 40 to the side of the frame and from that an adjustable link 40 leads to the lower end of the vertical lever 41, which is fulcrumed at 42 in the side of the frame.

When the upper end of the lever 41 is drawn rearwardly, the ratchet wheel 20 will be actuated in starting.

50 is a gravity pawl pivoted at 51 so as to normally cause it to engage the ratchet wheel 20 and prevent backward movement. The purpose of this is to hold the ratchet wheel and, therefore, the pistons of the engine in their partially actuated position, if one throw of the lever 41 should fail to start the engine. The pawl 50 would hold them in their positions until a new hold could be gotten by the bar 27 and pawl 28 for further rotation of the engine shaft.

The actuating pawl 28 is held normally out of engagement with ratchet wheel 20 by cable 60 that runs over pulleys 61 and 62 back to the pedal mechanism 63. The pawl 50 for preventing backward movement is also held out of engagement with the ratchet wheel by cable 64 that passes the pulleys 65 and 66, and connects with the cable 60 so that the one means hold both the pawl mechanisms out of engagement with wheel 20 after the engine has been started.

What I claim as my invention and desire to secure by Letters Patent is:

1. In combination with the shaft of an explosive engine, of a gear secured thereon, oscillatory means pivoted away from the gear and its axis, a curved bar pivoted at one end to said oscillatory means and extending beside said gear, and an adjustable pawl on the other end of said bar for engaging the teeth at one side of the gear during the movement of said bar, whereby said gear will be actuated to start the engine.

2. In combination with the shaft of an explosive engine, of a gear secured thereon, oscillatory means pivoted away from the gear and its axis, a curved bar pivoted at one end to said oscillatory means and extending beside said gear, a pawl on the other end of said bar and having a body portion pivoted on said bar, a tooth projecting laterally therefrom in position to engage the teeth of said gear and cause the rotation thereof when said bar is actuated, a clamp extending through the body portion of said pawl, and a slot in said bar for holding the pawl in position to give the tooth the desired angular relation to the teeth of the gear.

3. In combination with the shaft of an explosive engine, of a gear secured thereon, oscillatory means pivoted away from the gear and its axis, a curved bar pivoted at one end to said oscillatory means and extending beside said gear, an adjustable pawl on the other end of said bar for engaging the teeth at one side of the gear during movement of said bar, whereby said gear will be actuated when the engine is started, and a gravity pawl in position to catch the teeth of said gear under the influence of gravity and prevent the backward movement thereof, and means for holding said pawl disengaged from said gear.

4. In combination with the shaft of an explosive engine, of a gear secured thereon, oscillatory means pivoted away from the gear and its axis, a curved bar pivoted at one end to said oscillatory means and extending beside said gear, an adjustable pawl on the other end of said bar for engaging the teeth at one side of the gear during movement of said bar, whereby said gear will be actuated when the engine is started, and a single means for holding both the actuating pawl and the pawl for preventing backward movement of said gear away from said gear after the engine has been started.

In witness whereof, I have hereunto affixed my signature in the presence of the witnesses herein named.

GEORGE BURESS.

Witnesses:
 G. H. BOINK,
 O. M. McLAUGHLIN.